United States Patent [19]

Martin

[11] 4,086,166
[45] Apr. 25, 1978

[54] WATER FILTERING AND DISPENSING APPARATUS

[76] Inventor: Ernest Newell Martin, 1027 E. 5th St., Escondido, Calif. 92025

[21] Appl. No.: 781,682

[22] Filed: Mar. 28, 1977

Related U.S. Application Data

[63] Continuation-in-part of Ser. No. 597,354, Jul. 21, 1975, abandoned.

[51] Int. Cl.² .......................................... B01D 31/00
[52] U.S. Cl. ............................. 210/134; 210/257 M; 210/433 M; 210/321 R
[58] Field of Search ................... 210/134, 136, 321 R, 210/433 M, 257 M

[56] References Cited

U.S. PATENT DOCUMENTS

| | | | |
|---|---|---|---|
| 3,384,240 | 5/1968 | Berardi | 210/279 X |
| 3,493,496 | 2/1970 | Bray et al. | 210/257 M X |
| 3,565,256 | 2/1971 | Loeffler | 210/321 R X |
| 3,616,921 | 11/1971 | Bray | 210/257 M X |
| 3,630,378 | 12/1971 | Bauman | 210/257 M |
| 3,688,911 | 9/1972 | Baerg | 210/321 R |
| 3,716,141 | 2/1973 | Spatz | 210/321 R X |
| 3,719,593 | 3/1973 | Astil | 210/321 R X |
| 3,794,172 | 2/1974 | Bray | 210/257 M |
| 3,794,173 | 2/1974 | Bray | 210/321 R X |
| 3,831,757 | 8/1974 | Gossett et al. | 210/257 M X |

Primary Examiner—Frank A. Spear, Jr.
Attorney, Agent, or Firm—Georges A. Maxwell

[57] ABSTRACT

A water filtering and dispensing apparatus comprising a filtering device receiving unfiltered water under pressure from a water service system and operable to deliver filtered water and waste brine under pressure, a filtered water delivery line extending from the device to a dispensing valve, a storage tank with spaced brine inlet and outlet openings, a brine line between the device and the inlet opening, a pressure reducing regulator in the brine line upstream of the tank, a filtered water receiving inflatable bladder in the tank and means connecting the bladder with the delivery line upstream of the dispensing valve, a waste line connected with and extending downstream from the brine outlet opening in the tank, a flow limiting flow control means and a normally open bladder actuated shut-off valve downstream of the tank, said shut-off valve operable to close only when the bladder in the tank is filled with a full supply of filtered water, whereby flow of waters and brine into and out of the apparatus stops when a full supply of filtered water is established and is re-established when filtered water is dispensed and less than a full supply exists.

6 Claims, 4 Drawing Figures

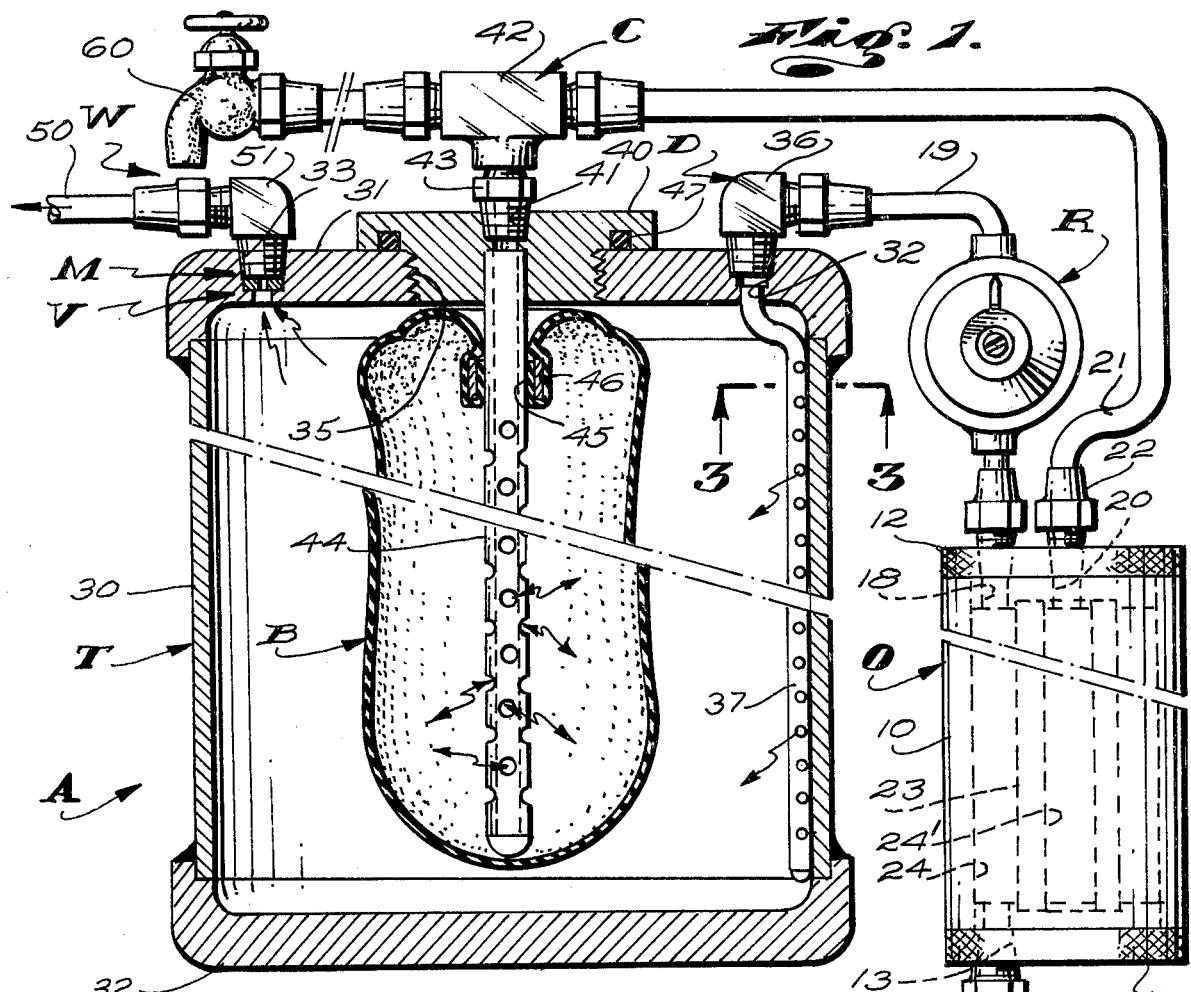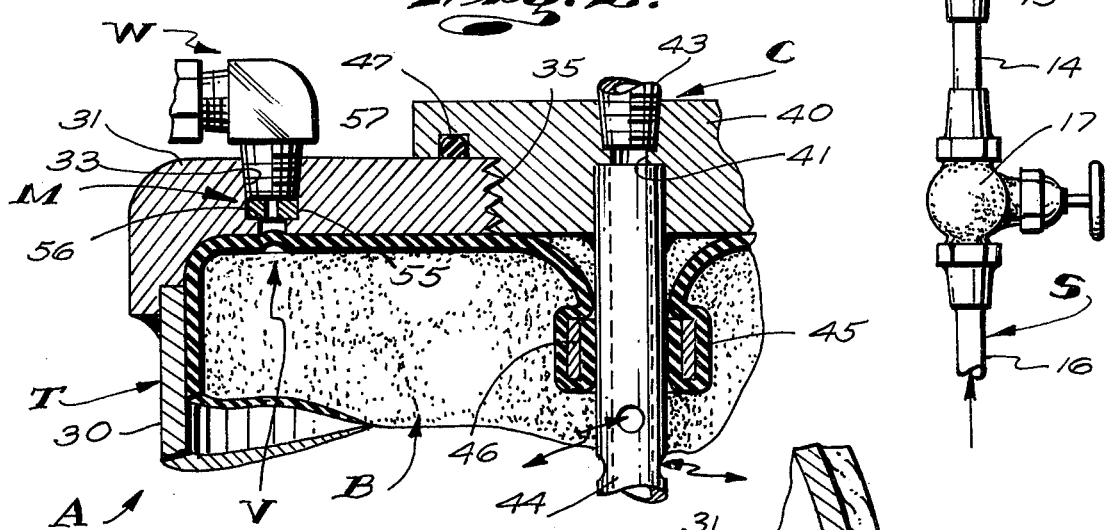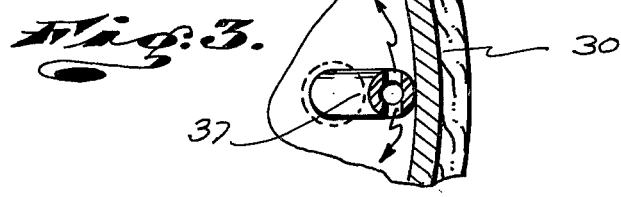

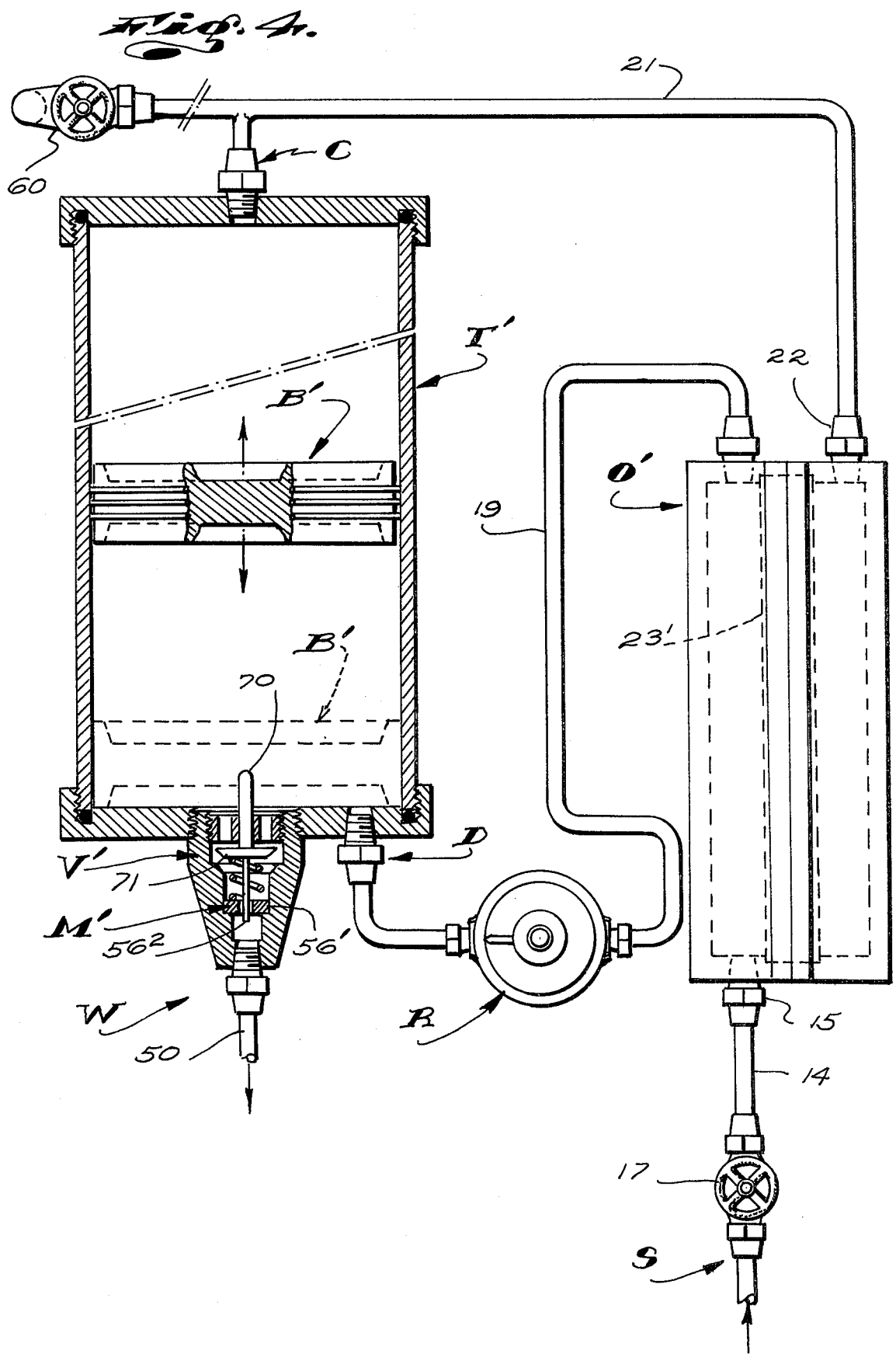

WATER FILTERING AND DISPENSING APPARATUS

This is a continuation in part of my co-pending application for U.S. Letters Patent Ser. No. 597,345, filed July 21, 1975, for WATER PURIFYING AND DISPENSING APPARATUS, now abandoned.

This invention has to do with an improved water filtering, storing and dispensing apparatus and is particularly concerned with an apparatus which is adapted to be connected with a pressurized municipal service water system or the like and which is operable to filter, purify or upgrade the quality of the service system water, store all of the filtered water produced thereby for subsequent dispensing thereof, on demand, and an apparatus wherein waste water or brine which is the by-product of filtration is utilized as a motive fluid to act upon and effect pressure dispensing of stored filtered water.

The prior art has long recognized the need for an apparatus, suitable for domestic use, which will effectively and efficiently filter and/or purify impure or low quality service water distributed through municipalities and the like, under suitable pressure, by service water systems.

In efforts to meet and to satisfy the above noted need, those active in the art to which this invention relates have provided various apparatus which connect with pressurized water service systems and which operate to filter service water flowing from the systems; store a supply of the filtered water ready for use and which utilizes the pressure of the service water systems to effect dispensing filtered water from their established supplies, when demanded.

While many of those prior art apparatus of the character referred to above have functioned or operated to attain certain of the desired ends, it cannot be determined or found that any such apparatus has proved to be sufficiently effective and economical in operation and use to have gained any notable or significant commercial success.

Examination and study of the prior art clearly discloses that the principal shortcoming found to exist in those apparatus which have been developed to date resides in wasteful use of service water which renders the apparatus too costly and economical to operate. In such cases, it is commonly found that a constant or continuous flow of service water into through and from the apparatus is required and that over protracted periods of time, considerable more service water is used than is required to produce the volume of filtered water that is ultimately used.

In arid and semi-arid parts of the country where water is in short supply, and is costly, wasteful use of water such as is noted above is not only economically prohibitive or imprudent, but is such that it offends those policies and standards pertaining to the conservation of water which have been adopted in many localities.

Other notable shortcomings commonly found in prior art apparatus of the character referred to above is the tendency of many of such apparatus to require frequent and costly servicing, a lack of dependability in operation and complexity in make-up which renders them excessively costly to make and/or install and which lends to their being undependable in operation and costly to maintain.

It is a principal object and feature of this invention to provide an apparatus of the general character referred to which is such that substantially all service water spent in the operation of the apparatus is utilized in the production of filtered water and which is such that the waste water or brine which is the by-product of filtration is utilized as a motive fluid to maintain desired pressure differentials and to effect dispensing of filtered water under desired predetermined pressure, upon demand; whereby little or no water is wasted in the course of operation and use of the apparatus.

It is an object and feature of the present invention to provide an apparatus of the character referred to which is such that it operates to make and to store a limited predetermined volumetric supply of filtered water for dispensing and use, upon demand, and an apparatus which is such that it operates to consume service water and produce filtered water only when less than a full supply of filtered water is present and which shuts off automatically to stop all flow therein when a full supply of filtered water is present. A further object is to provide an apparatus wherein a filtering membrane or filter pack in a filtering device included in the apparatus is only subjected to use or operation when filtered water is being produced to replenish the supply of filtered water and is at all other times out of use or service so that the useful life of the membrane or filter pack is extended, or is not shortened by continuous production of excess filtered water, for which no storage capability or beneficial use is provided.

It is an object and feature of this invention to provide an apparatus of the character referred to above which effectively eliminates all costly and wasteful excess and useless flow of service water, by automatically shutting off all flow of waters and brine into, through and out of the apparatus when a full supply of filtered water is established in the apparatus.

It is still another object and feature of the present invention to provide an apparatus of the character referred to above which is easy, simple and economical to make, and which is highly effective, dependable and economical in operation.

An object and feature of this invention is to provide an apparatus of the character referred to above which includes a combination and relationship of parts having a specific rule of action which is distinct from those combinations and relationships of parts and the rules of action which characterize apparatus of the same or similar class provided by the prior art, and to provide an apparatus, which, by virtue of its distinct combination and relationship of parts and its particular and distinct rule of action is more efficient and more economical to operate than are apparatus of the same class provided by the prior art and which seek to filter and store water under pressure and to dispense the stored water by applied service water pressure, upon demand.

The foregoing and other objects and features of my invention will be fully understood and will become apparent from the following detailed description of typical preferred forms and applications of the invention throughout which description reference is made to the accompanying drawings, in which:

FIG. 1 is an illustration of my apparatus with portions broken away and in sections to better illustrate certain details of the construction;

FIG. 2 is an enlarged detailed sectional view of a portion of the structure shown in FIG. 1;

FIG. 3 is a sectional view taken as indicated by line 3-4 in FIG. 1; and

FIG. 4 is a view showing another form of my invention.

The apparatus A here provided first includes a water filter device O. In the case illustrated, the device O includes an elongate tubular body or case 10 with upstream and downstream sides or ends closed by suitable closures 11 and 12, respectively. The closure 11 at the upstream end of the case is provided with an inlet portion opening 13 which is connected with a water supply line 14 by means of a suitable fitting 15. The line 14 is connected with and extends from a water conductor 16 which is apart of a water service system S, such a municipal water supply system. In accordance with common and good practices, the line 14 is provided with a manually operable service valve 17 to start and stop the flow of service water, as desired and as circumstances require.

In the following, for the sake of brevity, the water service system S will be referred to as the "water service" and the water delivered thereby, which is impure or low quality water, will be referred to as service water.

As a general rule, municipal water services deliver service water under mean pressures of from 75 psi to 125 psi. For the purpose of this disclosure, it can be assumed that the service water is under a variable head of from 90 to 100 psi.

Referring once again to the device O, the closure 12 at the downstream end of the case is provided with a waste water or brine outlet port or opening 18 which connects with a waste water conductor or line 19 and a filtered water outlet port or opening 20 which is connected with a filtered water conductor or line 21.

Suitable tube fittings 22 are provided to effect connection of the related openings and lines 18-19 and 20-21.

The device O next includes an elongate tubular filter pack 23 extending longitudinally through the case 10 and cooperating therewith to define an annular service water passage 24 communicating with the openings 13 and 18 and defining a central filtered water passage 24' communicating with the opening 20.

In the preferred carrying out of the invention, the filter pack is established of a semi-permeable membrane such as is used in filtration by reverse osmosis and which is particularly suitable for filtering water in a conventional flow through manner. Since such a membrane is utilized in the preferred carrying out of the invention, the term "membrane" will sometimes be used in the following when referring to the filter pack.

Since the details of construction of the device O can vary widely in practice without affecting or departing from the spirit of my invention, further detailed description of the device O would only serve to unduly burden this disclosure and will therefore be dispensed with.

The principal of operation and/or function of the device O is apparent and well known to those skilled in the art to which the present invention relates and need not be considered in further or greater detail.

It should be noted that the rate of filtration through the membranes in devices of the class herein provided is slow relative to the rate of filtration effected by other more common forms of filtering means and/or mediums.

In the preferred carrying out of my invention, the apparatus A is a small, neat, compact unit with a capacity to provide filtered water at a rate near the maximum anticipated daily rate at which the average domestic consumer or user of bottled filtered or preferred water uses such water. It has been determined that a capacity to produce filtered water at a rate of about one quart per hour for intermittent dispensing of part of the water is adequate to meet the maximum anticipated rate of consumption of filtered water by the average domestic user of bottled filtered water.

The apparatus A, in addition to the above described filter device O, includes an accumulator or holding tank T into and through which waste water or brine flowing from the device O is directed or conducted and in which a flexible, inflatable bladder B, adapted to receive and hold a supply of filtered water flowing from the device O, is arranged.

The tank T and bladder B establish a unit, which is provided with and/or includes; connector means C to connect the bladder with the water conductor 21 which extends from the device O; waste water delivery means D to connect with the waste line 19, extending from the device O; regulator R; Brine discharge means W; flow control means M; and valve means V.

The tank T is an elongate vertical tank with a cylindrical side wall 30 and top and bottom end walls 31 and 32. The interior of the tank is smooth and free of sharp corners and edges.

The top wall 31 of the tank is provided with a waste water or brine inlet opening 32 at one side thereof and with which the delivery means D is related; a brine outlet opening 33 at another side thereof and spaced from the brine inlet opening and with which the discharge means W, control means M and valve V are related and a central opening 35 with which the connector means C is related.

The delivery means D includes a connector fitting 36, at the downstream end of the brine line 19 related to the tank T. The fitting 36 is shown engaged in the opening 32 in the tank and is shown related to and/or communicating with a dispenser means 37 related to the opening 32 and which is provided to effect controlled distribution of brine in the tank outside the bladder, to prevent the bladder B from impeding flow and distribution of brine into the tank when said bladder is fully inflated with filtered water and substantially fully occupies the tank.

In the case illustrated, the means 37 is a simple, elongate, vertical, perforated tube arranged adjacent the inside surface of the side wall of the tank and provided an upper end portion which is engaged in the opening 32 in open communication with the fitting 36 and line 19, substantially as illustrated in FIG. 1 of the drawings.

The connector means C, to connect the bladder B with the conductor 21, includes a closure plate 40 engaged in the opening 35 in the top wall 31 of the tank T. The closure plate has a central vertical filtered water conducting opening 41. A T-fitting 42 is engaged with and between upstream and downstream sections of the conductor 21 and has a leg which is connected with the upper end of the opening 41 by a suitable nipple or fitting 43. Finally, the means C includes an elongate vertical, perforated fluid conducting stinger 44 engaged in the lower end of the opening and depending into the confines or interior of the bladder B within the tank T.

The bladder B is a flexible, elastic, bag-like element established of non-permeable plastic, rubber or rubber-like material with an open upper neck portion 45 engaged and held in tight sealed engagement about the upper portion of the stinger 43 (above the perforations therein) by means of a clamping ring 46. The bladder is such that it can be collapsed substantially flat and in close engagement about the stinger by externally applied fluid (under pressure) whereby water within the bladder is displaced therefrom, into the stinger and thence outwardly through the means C and into the conductor 21. The bladder B is also such that it can be inflated by filtered water flowing inwardly from the conductor 21 and through the means C to substantially fully occupy and conform to the interior of the tank.

The opening 35 is sufficiently large to provide access to the interior of the tank for cleaning purposes and to permit the easy and convenient insertion and arrangement of the stinger and the bladder in the tank or removal of said stinger and bladder therefrom, for servicing and the like. But for the provision of the above noted conveniences, the closure could be eliminated and the opening 41 could be established centrally in the top wall 31 of the tank.

The closure 40 is provided with suitable sealing means 47 to assure a fluid tight seal between the closure and the tank.

The waste water or brine discharge means W includes an elongate waste line 50 with an upstream end connected with the brine outlet opening 33 by a suitable fitting 51. The line 50 extends to any suitable waste water receiving means or system (not shown) for disposal of the brine, after the useful ends it serves to perform have been attained.

The flow control means M comrises a flow limiting orifice 55 engaged in the opening 33, between the lower inner end of the fitting 51 and an upwardly disposed annular shoulder 56 defined by a counter bore established in and defining the upper portion of the opening 33. The orifice plate serves to limit and control the rate of flow of brine through the tank and outward through the means W.

The valve means V can vary widely in form and is shown as being established by the lower inner end of the opening 33 and the annular portion of the bottom surface of the top wall 31 about the opening and the portion of the bladder which overlies the opening 33 and said adjacent annular surface of the top 31 when the bladder is fully inflated in the tank, as clearly illustrated in FIG. 2 of the drawings.

The lower end of the opening 31 and the noted annular surface about the opening establish a valve seat and the definable portion of the bladder which engages that valve seat defines a valve member.

It will be apparent that when the bladder is fully inflated, the valve member engages the valve seat, closing the valve means V, whereby flow of brine into and out of the tank is stopped. When the bladder is other than full, the valve means is open and brine is free to continuously flow into, through and out of the tank.

The apparatus next includes a pressure regulator R upstream of the brine inlet opening 32 in the tank. The regulator R is engaged in the brine line 19 between the device O and tank T. The regulator R serves to reduce the pressure on the brine flowing from the device O preparatory to delivery of the brine into the tank. The reduced pressure downstream of the regulator R and in the tank T is less than the pressure of filtered water flowing from the device O, when the device is producing water for delivery into the bladder, whereby a pressure differential of desired predetermined extent is established between the brine in the tank about the bladder and the filtered water within the bladder so that the bladder can, when being filled and expanded, displace the brine in the tank through the brine outlet opening and means W.

The regulator R is a conventional pressure regulator with self-contained means for regulating the pressure of brine flowing downstream therefrom and is not dependent upon or affected by any external or secondary pressure source within or outside the apparatus.

Finally, the apparatus includes a manually operable dispensing valve 60 in the conductor 21, downstream of the means C. For example, the valve 60 can be at the downstream end of the line 21, remote from the device O and tank T.

To put the apparatus A to operation, the valve 17 is open to initiate the flow of service water into and through the apparatus downsteam of the water service S.

The water filtered by the device O flows downstream thereof through the line 21 to the dispensing valve 60. When the valve 60 is closed, the filtered water flowing into the line 21 is diverted or conducted from the conductor 21 through the means C, upstream of the valve 60 and into the bladder B within the tank T.

The filtered water flowing into the bladder B expands the bladder until such time as the bladder substantially completely occupies the tank, at which time a full supply of filtered water is provided.

When the bladder is filled, as above noted, and until such time as the valve 60 is opened to dispense a volume of water from the supply, the flow of additional filtered water from the device O is prevented or stopped and the production of filtered water is stopped. When this occurs, the pressure in the device O, at the opposite sides of the membrane equalizes and the membrane is rested.

During that time when the device O is producing filtered water and the bladder is being filled, as above noted, the waste water or brine flowing out of the device O flows through the line 19, through and into the tank T, under control of the pressure regulator R in said line whereby said brine within the tank T is at a pressure less than the pressure of the filtered water issuing from the device O an entering the bladder. The brine delivered to the tank as above noted fills the interior of the tank about the exterior of the bladder and thence flows out of the tank through the brine outlet opening 33, through the orifice of the flow control means M related to the opening 33. The orifice of the means M is such that it freely permits the flow of brine out of the tank at substantially the same rate that service water flows into the device O to produce brine and filtered water, whereby the means M does not create a back pressure which might impede the production of filtered water.

The volume of brine within the tank which is in excess of the volume of brine produced by the device O is displaced from the tank and urged out through the brine outlet opening 33 and thence into and through the line 50 of the means W for disposal as the bladder fills and is expanded in the tank.

The above operation continues until the bladder B is expanded with a full supply of filtered water, at which time the bladder, or the portion thereof defining the valve member of the valve means V, engages the valve seat at and about the inner end of the opening 33, closing said valve means. When the valve means V is thus closed, the flow of service water into the apparatus, from the service S, is stopped and the apparatus is left fully charged and at rest. That is, the bladder B is filled with a supply of filtered water, the exterior of the bladder is under and subjected to the regulated pressure on the brine downstream of the regulator R and flow of service water into and the flow of filtered water and brine within and from the apparatus is stopped.

When the pressures at the opposite sides of the filter pack or membrane 23 are equalized and flow or movement of water therethrough is stopped, matter on the service water or upstream side of the filter pack is released from those forces applied thereto by flowing water and which tend to hold it on the membrane. When such matter is thus released, it is free to move, drop or drift from engagement on the membrane. Further, during such periods of rest, salts collected by the filter pack are free to leach out of the pack and combine with the service water and/or brine at the downstream side of the membrane, within the device.

When it is desired to dispense filtered water, the valve 60 is open and filtered water in the bladder B immediately commences to flow therefrom. Such flow of filtered water is caused by compressing or collapsing of the bladder by and under the pressure of the brine in and flowing to the tank at said regulated pressure. The flow control means M restricts the flow of brine from the tank T at a substantially lesser rate than the rate at which brine flows into the tank when the valve 60 is open, thus assuring the dispensing of filtered water, as desired.

Further, immediately upon opening of the valve 60 and dispensing of filtered water, as above noted, the supply of filtered water is depleted and the bladder B collapses, opening the valve means V. Accordingly, the flow of service water into the device O and the flow of brine from the device O and into the tank T, under regulated pressure commences and the flow of filtered water from the device O into and through the line 21 commences, for dispensing through the valve 16 or for delivery into the bladder, to replenish the supply.

When the the valve 60 is again closed and the filtered water in the bladder has been partially or wholly dispensed, leaving the bladder partially or wholly collapsed in the tank, the process or function of filtering water, filling the bladder and displacing or reducing the volume of brine flowing through the tank, as noted in the above, commences once again and continues until the device is once again fully charged with filtered water and is at rest, ready to discharge additional volumes of filtered water, on demand.

It is to be noted that when the valve 60 is opened and flow in and through the device O is reestablished, the initial flow of service water into and brine out of the device is at a substantial rate and serves to effectively flush and clean the service water side of the membrane 23 in the device O, carrying accumulated foreign matter and dissolved salts from the device, downstream through and thence from the apparatus.

As a result of the previously noted periodic neutralizing of pressures across the membrane, coupled with above noted flushing action, the necessity of servicing and cleaning the device O is materially reduced and in some instances is or can be eliminated, throughout the normal or expected service life of the membrane in the device. The anticipated or expected service life of the membrane is notably extended by the intermittent stopping and starting of flow which is attained by this invention.

As regards the valve means V described above, it will be apparent that other equivalent valving means can be substituted therefor without departing from the present invention. For example, the valve means V could include an electrically operated shut-off valve in the line 50 and under control of a micro-switch having an operating trigger projecting into the tank to be engaged by the bladder when it is filled, whereby the valve closes when the bladder is inflated and filled.

The stinger 44 of the means C within the bladder B assures that substantially all of the water in the bladder B can be dispensed therefrom when the bladder B is collapsed within the tank and about the stinger, by the brine surrounding and acting upon it.

It will be apparent that in practice, the device O can be replaced by other fluid filtering devices without departing from the spirit of the invention. For example, filter devices similar to the device O, but including filtering packs of charcoal, diatomaceous earth, string or the like, could be substituted for the device O. While such substitutions might alter the quality of filtration, the operation of the apparatus would remain substantially unchanged.

In FIG. 4 of the drawings, I have illustrated another form of my invention wherein the filter device O' is shown provided with a flat, plate-like filter pack 23' rather than a cylindrical pack such as provided in the first form of the invention; wherein the brine and the filtered water in the tank T' are separated by a free floating partition or piston B', sealingly engaged and shiftable longitudinally in a bore of the tank, rather than by a bladder as provided in the first form of the invention and wherein the valve means V' at the brine outlet of the tank T' is a mechanically operated poppet type valve structure with an operating stem 60 projecting into the tank and engageable by the piston B'.

In this second form of the invention, the flow control means M' includes or is established by an orifice plate 56' in the valve body and an elongate rod $56^2$ carried by the valving member or poppet 61 and extending freely through the plate 56' to define an annular flow metering passage. The rod $56^2$ is shiftable axially through the plate 56', upon movement of the valve member whereby foreign matter which might plug the orifice or annular passage is moved and/or displaced thereby.

In all other respects, this second form of the invention is essentially the same as the first form of the invention and, where appropriate, like reference characters are directed to like or equivalent parts.

It is important to note that the rate of filtration effected by my apparatus, when the valve 60 is closed and the supply of filtered water in the bladder B is being replenished is adjusted, established, determined or controlled by the regulator R and the flow control means M and the pressure differential between the upstream and downstream sides of the membrane 23 of the device O established thereby.

The pressure at the upstream or service water side of the membrane 23 must be greater than the pressure at the filtered water or downstream side thereof, whereby the differential in pressures is of a magnitude at which the membrane filters most effectively and a magnitude which the membrane can dependably sustain without adverse effects.

The regulated pressure on the brine downstream of the regulator R and in the tank T is below or less than the service water pressure and the flow control means M allows for the flow of brine from the tank at a rate equal to the rate of flow of service water into the apparatus and the corresponding rates of flow of filtered water and of brine in the bladder B and the tank, whereby the pressure on the brine in the tank remains constant. The pressure at the downstream side of the membrane, when the valve is closed, is the service water pressure, less that loss of pressure resulting from friction loss as a function of the rate of filtration afforded by the membrane. Since flow of brine out of the tank T through the means M is substantially equal to the rate of flow of brine and filtered water into the tank and the bladder, no appreciable increased or back pressure is established by brine in the tank, which might block or impede the production of filtered water and its flow into the bladder in the tank. It will be apparent therefor that the regulated brine pressure in the tank can be adjusted and set by means of the regulator R whereby the desired pressure differential across the membrane 23 and the rate of filtration or production of filtered water can adjust and set as desired or as circumstances require (when the valve is closed).

While the means M must be adjusted and properly balanced with the regulated pressure and filtering characteristics of the membrane to attain optimum efficiency, it has been determined that if the control of flow afforded by the means M is at or near the average or mean controlled flow that is anticipated, a sufficient range of adjustment can be obtained by or through the regulator R alone to attain highly effective and efficient operation of the apparatus.

It is to be noted that with the apparatus here provided, the supply of filtered water in the bladder B within the tank is always under a pressure which is never less than the regulated pressure on the brine established by the regulator upstream of the tank in the line 19.

The only time pressure on the filtered water might drop appreciably below the noted regulated pressure is when the valve 60 remains open after the entire supply of filtered water in the bladder has been dispensed. Under such circumstances, the flow of filtered water in the conductor 21 and out of the valve 60 would be reduced to that rate at which the unit O produces filtered water. Under such circumstances, while filtered water would not flow at any appreciable rate from the valve 60, it would continue to flow at the same pressure.

It is notable that with the apparatus here provided, the valve 60 can be left cracked open or a substituted equivalent water dispensing flow control device can be operated whereby a small, controlled volume or trickle of water can be effectively dispensed continuously or intermittently. One well known and common apparatus in which small constantly flowing volumes of water are utilized or required is automatic ice makers such as are used in bars, restaurants and which are standard equipment in some domestic refrigerators.

Having described only preferred forms of my invention, I do not wish to be limited to the specific details herein set forth, but wish to reserve to myself any modifications and/or variations that might appear to those skilled in the art and which fall within the scope of the following claims.

Having described my invention, I claim:

1. A water filtering and dispensing apparatus comprising a filter device including a case, a filter pack within the case and defining upstream and downstream sides thereon and in the case, a service water inlet port and a brine outlet port in the upstream side of the case and a filtered water delivery port in the downstream side of the case, a water supply line connected with and between a high pressure service water system and the inlet port, an elongated brine line connected with and extending from the brine outlet port and an elongate filtered water delivery line connected with and extending from the delivery line downstream from said device, a holding tank with an upstream brine inlet opening, a downstream brine outlet opening spaced from the brine inlet opening and a filtered water transfer opening spaced from said brine inlet and outlet openings; the end of the brine line remote from the device is connected with the brine inlet opening, an inflatable filtered water receiving bladder within the tank with its interior communicating with the transfer opening, means connecting said transfer opening with the delivery line between the device and the dispensing valve, a waste line connected with and extending downstream from the brine outlet openings, a pressure regulator in the brine line between the device and the tank reducing the pressure on brine flowing into and through the tank below the pressure in service water system and in the delivery line when the dispensing valve is closed, flow control means downstream of the tank limiting the flow of brine into, through and from the tank to near the rate of flow of service water into the device and the corresponding rate of flow of brine and filtered water from the device when the dispensing valve is closed and at a rate below the rate of flow of brine into the tank and the rate of flow of filtered water from the apparatus when the dispensing valve is open and a normally open bladder actuated shut-off valve at the brine outlet opening and operated to close when the bladder is inflated in the tank by a predetermined full supply of filtered water whereby flow of service water into and filtered water and brine through and out of the apparatus is stopped until the dispensing valve is opened, said full supply of filtered water is depleted and said shut off valve is opened.

2. The apparatus set forth in claim 1 wherein said flow control means includes an orifice plate arranged in the brine outlet opening.

3. The apparatus set forth in claim 2 wherein said shut-off valve includes an annular seat defined by the brine outlet opening and a portion of an interior surface of the tank about said opening and a valve member shiftable into and out of engagement with the seat and defined by that portion of the bladder which moves into engagement with the seat when the bladder is inflated within the tank.

4. The apparatus set forth in claim 1 wherein said shut-off valve includes an annular seat defined by the brine outlet opening and a portion of an interior surface of the tank about said opening and a valve member shiftable into and out of engagement with the seat and defined by that portion of the bladder which moves into engagement with the seat when the bladder is inflated within the tank.

5. The apparatus set forth in claim 1 wherein said shut-off valve includes a part of the brine outlet opening defining an annular valve seat concentric with said opening, a spring loaded valve member concentric with and shiftable axially into and out of engagement with the seat and an operating stem projecting from the member into the tank and engaged by the bladder to close the valve when the bladder is inflated in the tank with a full supply of filtered water.

6. The apparatus set forth in claim 1 wherein said shut-off valve includes a part of the brine outlet opening defining an annular valve seat concentric with said opening, a spring loaded valve member concentric with and shiftable axially into and out of engagement with the seat and an operating stem projecting from the member into the tank and engaged by the bladder to close the valve when the bladder is inflated in the tank with a full supply of filtered water, said flow control means includes an orifice plate at the brine outlet opening adjacent said shut-off valve.

* * * * *